United States Patent [19]

Wyant et al.

[11] 4,128,429

[45] Dec. 5, 1978

[54] ANTIFOULING QUATERNARY HALIDE SALTS CONTAINING A TRIORGANOTIN ETHER MOIETY

[75] Inventors: Robert E. Wyant; Henry M. Grotta, both of Delaware, Ohio

[73] Assignee: Sankyo Organic Chemicals Company Limited, Kawasaki, Japan

[21] Appl. No.: 757,240

[22] Filed: Jan. 6, 1977

[51] Int. Cl.$^2$ .............................. C09D 5/14
[52] U.S. Cl. .................... 106/15 R; 106/16; 260/45.75 K; 260/326.85; 260/429.7; 424/288; 544/225; 544/64; 546/6
[58] Field of Search ............ 260/429.7, 45.75 K, 260/242, 326.85; 106/15 R, 16; 424/288

[56] References Cited

U.S. PATENT DOCUMENTS

| | | | |
|---|---|---|---|
| 3,344,019 | 9/1967 | Sowa | 424/288 X |
| 3,443,010 | 5/1969 | Lombardo | 424/288 X |
| 3,755,595 | 8/1973 | Goring et al. | 424/288 |
| 3,933,877 | 1/1976 | Wirth et al. | 260/429.7 |
| 3,997,461 | 12/1976 | Davie | 424/288 X |

FOREIGN PATENT DOCUMENTS 945068  12/1963  United Kingdom .................... 424/288

OTHER PUBLICATIONS

Chemical Abstracts, 65, 5490d, (1966).
Chemical Abstracts, 70, 68521w, (1969).

*Primary Examiner*—Helen M. S. Sneed
*Attorney, Agent, or Firm*—Flynn & Frishauf

[57] ABSTRACT

Disclosed are the usage, preparation, and evaluation of marine antifouling quaternary halide salts containing a cation portion which includes a trialkyltin ether moiety linked to a carbon atom at least two carbon atoms removed from the quaternized nitrogen atom. Taught as providing exceptional marine fouling inhibition are the quaternary salts of benzyl bromide and tertiary amines containing a tributylstannyl ether moiety at least two carbon atoms removed from the amino nitrogen atom with illustrated specific examples including the quaternary salts of benzyl bromide and 2-dimethylamino-2-methyl-1-propyl tributylstannyl ether, benzyl bromide and 1-dimethylamino-2-propyl tributylstannyl ether, benzyl bromide and 2-[N-pyrrolidinyl]ethyl tributylstannyl ether, and benzyl bromide and 2-diisopropylaminoethyl tributylstannyl ether. For antifouling purposes the quaternary salt is blended or dissolved in a resinous polymer component of a marine paint composition applied to an article's surface subsequently to be immersed in ocean water.

8 Claims, No Drawings

ANTIFOULING QUATERNARY HALIDE SALTS CONTAINING A TRIORGANOTIN ETHER MOIETY

DISCLOSURE OF THE INVENTION

This invention relates to the usage of, preparation of, and evaluation of marine antifoulants which include an organotin moiety. More particularly it concerns significantly useful particular marine antifouling agents which are quaternary halide salts having a cation portion characterized by a trialkyl tin moiety (especially tributyl tin moiety) linked by an ether linkage to a carbon atom at least two carbon atoms removed from a quaternized nitrogen atom of the cation.

BACKGROUND

Organotin compounds, especially the trialkyl and triaryltin compounds have been known to possess biocidal activity at least since about the 1940's and as early as 1958 there issued a German Pat. No. 1,042,975 concerning an organotin (triphenyltin chloride) contained in antifouling paint. Since that time knowledge about various organotins and varied organotin compounds for marine antifouling purposes has increased. Among the more prevalently advocated organotins for marine purposes are bis(tri-n-butyltin) oxide, bis(tri-n-butyltin) sulfide, and tri-n-butyltin fluoride with the following including illustrative teachings of them: for the first mentioned - Netherlands application Nos. 6,480,317 and 6,511,311, British Pat. No. 1,001,639 (1960), and U.S. Pat. No. 3,227,563; for the second mentioned - British Pat. No. 917,629 (1963) and U.S. Pat. No. 3,234,032; and for the last mentioned - German Offen. No. 1,941,849 (1970) and So. African Pat. No. 67 04,668. Biocidally active quaternary ammonium complexes are taught in U.S. Pat. No. 3,070,615; germicidal and fungicidal quaternary ammonium organotin halides are disclosed in U.S. Pat. No. 3,346,607; Japanese Pat. No. 10,102 (1966) teaches quaternary organotin compounds to inhibit growth of various organisms; quaternary ammonium-tin halide polymers are taught in U.S. Pat. No. 3,242,105; and U.S. Pat. Nos. 3,539,605 and 3,397,215 include teachings of preparing quaternary ammonium compounds whose anionic portion thereof may include any of a number of various metals. East German Pat. No. 63,490 and Japanese Pat. No. 6172 (1966) include teachings of organotin ether compounds containing a tertiary amine group.

SUMMARY STATEMENT OF THE INVENTION

In the present invention one prepares an antifouling quaternary halide salt containing a triorganotin ether moiety by a procedure which involves preparation of a triorganostannyl ether of a tertiary amine and then preparation of the quaternary salt from this ether. For preparation of the ether one takes an amino alcohol or phenol having a tertiary amino nitrogen spaced at least two carbon atoms from its hydroxyl functional group and a bis(triorganotin) oxide, preferably bis(tributyltin) oxide, in an aromatic hydrocarbon solvent, preferably benzene, and refluxes this mixture with water which forms during the reaction being removed so as to expedite completion of the reaction. The prepared triorganostannyl ether of the tertiary amine then is quaternized by reacting it with an aryl halide, preferably benzyl bromide, or $C_8$–$C_{24}$ aliphatic hydrocarbon halide for a time requisite to provide quaternization. Heat is used to effect the quaternization and conveniently applied by refluxing an aromatic hydrocarbon liquid, preferably xylene, containing the reactants until the desired quaternary salt is produced.

The quaternary salt of the invention is from quaternization of the aryl halide or the $C_8$–$C_{24}$ aliphatic halide and a tertiary amine containing a triorganostannyl ether moiety whose etheral oxygen atom links a trioganotin radical to a carbon atom at least two carbon atoms removed from a tertiary amino nitrogen atom of the tertiary amine. Preferred is a quaternary salt of benzyl bromide or n-dodecyl bromide and a tertiary amine containing a tributylstannyl ether moiety whose etheral oxygen atom links a tributyltin radical to a carbon atom at least two carbon atoms removed from a tertiary amino nitrogen atom of the tertiary amine. Especially preferred is the quaternary salt of benzyl bromide and the tertiary amine containing the tributylstannyl ether moiety.

Submerged portions of ships, boats, piers, buoys, water-intake pipes, and like articles in ocean waters as immersion time passes invariably become fouled by marine organisms to the detriment of the article's use. The quaternary salts of the invention possess useful biocidal properties, or at least significantly inhibit growth of marine organisms, and are especially useful as antifouling additives in compositions for coating articles used in water. As inhibitors of marine fouling, the invention's quaternary salts are quite exceptional. In evaluations to date each prepared quaternary salt of the invention has shown utility as a marine antifoulant. In comparison to tributyltin oxide as a standard for antifouling activity, preferred quaternary salts of benzyl bromide and the tertiary amine containing the tributylstannyl ether moiety have equaled or exceeded the standard's antifouling properties and our especially preferred quaternary salts have exhibited significantly superior inhibiting marine antifouling properties. For use as a marine antifoulant, the quaternary salt is included in a component of a coating composition which is applied to adhere to the article's surfaces subsequently subjected to ocean water immersion. Conventionally such coating compositions are marine paint compositions including a synthetic resinous polymer or the like as a principal constituent. The invention's quaternary salts mix readily with and/or dissolve in conventional marine paints containing synthetic resin polymers. The compatibility of blending and/or solubilization with the resinous polymer constituent arises from the highly organic nature of the quaternary salt. Except for its tin atom, divalent etheral oxygen atom, and quaternized nitrogen atom the quaternary salt is predominantly organic and composed of carbon and hydrogen atoms which largely determine oleophilic and hydrophylic solubities and also blending compatibility with synthetic resin polymers. This highly organic nature of the quaternary salt gives the quaternary salt limited water solubility to provide effective antifouling resistance over lengthy periods of time as it slowly releases from a marine paint containing it.

DETAILED STATEMENT OF THE INVENTION

Included in the invention is a quaternary salt of an aryl halide or a $C_8$–$C_{24}$ aliphatic hydrocarbon halide and a tertiary amine containing a triorganostannyl ether moiety whose etheral oxygen atom links a triorganotin radical to a carbon atom at least two carbon atoms removed from a tertiary amino nitrogen atom of the tertiary amine and which quaternary salt is of the formula

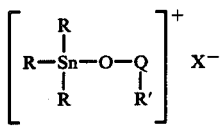

wherein
X is Cl, Br, or I, and preferably is Br, each R is an alkyl radical of up to 12 carbon atoms with the sum total of the carbon atoms in the three not exceeding 24 and preferably totaling 12 carbon atoms and with no more than one of the three containing more than 4 C atoms and with each of the three not necessarily the same, but preferably the same R and preferably each being a butyl radical, R' is an aryl hydrocarbon radical, preferably the benzyl radical, or a $C_8$–$C_{24}$ alkyl radical, preferably a straight chain alkyl radical, and especially preferably being $C_{12}$, and Q is a quaternized moiety of a tertiary amine moiety selected from the group consisting of an aliphatic tertiary amine moiety of the structure

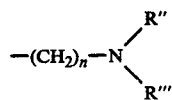

wherein n is a whole number integer of 2–5 and preferably is 2, and a methyl radical may replace a —H for up to and including two of the —H in the —(CH$_2$)$_n$— chain, and R″ and R‴ are $C_1$–$C_{10}$ alkyl radicals not necessarily the same, but preferably the same and especially preferably both methyl or ethyl radicals, a heterocyclic tertiary amine moiety of the structure

wherein

represents a pyrrolindinyl, morphilino, or piperazino ring, and n is a whole number integer of 2–5 and preferably is 2, a heterocyclic tertiary amine moiety with aromaticity of the structure

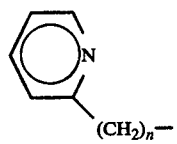

wherein n is a whole number integer of 2–5 and preferably is 2, and a tertiary amine structural moiety including an aromatic ring of the structure

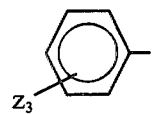

wherein Z is the same or different and at least one Z is —NR$_2$ or —(CH$_2$)$_n$NR$_2$ and any remaining Z is H, with R a $C_1$–$C_{24}$ alkyl radical, preferably methyl or ethyl, and n is a whole number integer of 1–5 and preferably is 1.

To prepare a quaternary salt of the invention, one can initiate its preparation from a known starting material of an amino alcohol wherein the nitrogen is a tertiary amino nitrogen and is spaced at least two carbon atoms removed from a hydroxyl group. A large number organic compounds containing both a tertiary amine moiety and an hydroxyl moiety in their structure are known in the art with a number commercially available. In addition, the art makes available a variety of procedures for preparing additional hydroxyl-containing tertiary amine organic compounds, including for example, the methods of Blicke, "Organic Reactions", 1, 330(1942), and Cavitt, "J. Org. Chem." 27, 1211(1962). Illustrative but not inclusive of all useful starting reactants, are the following hydroxyl-containing tertiary amines; 3-diethylaminophenol; 2-dimethylaminomethyl phenol; 2-diethylaminomethyl phenol; ortho-, meta, and para-dimethylaminophenol; ortho-, meta, and para-dimethylaminothiophenol; ortho-, meta-, and parahydroxy-N,N-dimethyl aniline; 2-(β-hydroxyethyl) pyridine; 2,4,6-tris(dimethylaminoethyl)phenol; 2-diethylaminoethanol; 2-diethylaminopropanol; 2-diisopropylaminoethanol; 2-dibutylaminoethanol; 2-dimethylaminoethanol; 3-dimethylaminopropanol; 3-dimethylaminoisopropanol; 2-dimethylamino-2-methyl-1-propanol; 2-diethyhexylaminoethanol; N(β-hydroxyethyl)morpholine; N(γ-hydroxypropyl)morpholine; 2,4-pyridinediol; 2,6-pyridinediol; N-(β-hydroxyethyl)pyrrolidine; N-(γ-hydroxylpropyl)pyrrolidine; N(β-hydroxyethyl)piperazine; N-(γ-hydroxylpropyl)piperazine; etc.

With a starting material of an amino alcohol having its amino nitrogen spaced at least two carbon atoms removed from its hydroxyl group, one reacts therewith bis(tributyltin) oxide to prepare its corresponding organotin ether compound. A useful general procedure for this reaction is that in East German Pat. No. 63,490 (1968) for the preparation of the tributyltin ether of 1-phenyl-2-(diethylamino)ethanol and in Japanese Pat. No. 6172 (1966) for the conversion of a number of amino alcohols into their organotin ether derivatives. In general one reacts about one mole of bis(tributyltin) oxide (TBTO) for each two moles of the amino alcohol or phenol, when the amino alcohol or phenol contains a single hydroxyl group for conversion to its monoether derivative. Where the amino alcohol or phenol contains a multiplicity of hydroxyl groups for reaction with tributyltin oxide to form an organotin polyether derivative, the molar ratio of TBTO to such tertiary amines containing a plurality of hydroxyl groups desirably is about 1 mole of TBTO for each 2 molar equivalents of hydroxyl groups to be etherified. Of course larger and smaller amounts of TBTO are useful, but incomplete formation of the ether derivative results with the use of smaller TBTO ratios and excess TBTO found with the product when employing larger TBTO ratios. Conveniently the reaction is carried forth in an aromatic hydrocarbon solvent, e.g. benzene, for the amino alcohol or phenol with refluxing of the solvent-reactant mixture and with the water formed by the reaction being azeotropically distilled therefrom. In some instances, it is possible to merely carefully heat while mixing the reactants without a solvent present, and to distill the water formed therefrom to provide the tributyltin ether derivative of the hydroxyl-containing tertiary amine starting material. Time for reaction can vary, but usually is between 10 and 116 hours. A convenient means to follow the extent of the reaction is to measure the amount of formed water removed from the reaction mixture. When solvent is used, it may be distilled or fractionated from the formed product. Generally a fractionation under reduced pressure of the formed product provides a product of adequate purity for characterization and confirmation of its structure and for utility in preparation of a quaternary salt of the invention.

To prepare a quaternary salt of the invention, the tributyl tin ether derivative of the tertiary amine starting material is reacted, generally in about the equal molar amounts, with an aryl halide, e.g. benzyl bromide, or a long-chain ($C_8$–$C_{24}$) aliphatic hydrocarbon halide, e.g. n-dodecyl bromide. Larger and smaller amounts of halide reactant can be used, but with incomplete quaternization of the tributyl tin ether derivative upon using the smaller amounts and with unreacted halide compound found with the formed quaternary salt upon using larger amounts. Conveniently the quaternization reaction is carried forth by heating the tributyl tin ether derivative and its quaternizing aryl or aliphatic halide with mixing in an aromatic hydrocarbon liquid, such as a xylene and preferably para-xylene, and generally with the mixture refluxed (about 144° C. for p-xylene) until quaternization is completed. Refluxing time for substantially complete quaternization can range from less than one day up to about one week or longer. Infrared spectral analysis and/or thin layer chromatographic analysis of the formed product or small portions thereof, after various time periods of refluxing, permits one readily to determine when quaternization is substantially completed. Of course one generally removes the hydrocarbon liquid, e.g. xylene, from the product before these analyses, with the xylene conveniently removed by vacuum distillation or like means. The formed quaternary salt product also is similarly stripped of its xylene or like hydrocarbon liquid.

While the just described preparation methods specify benzene as a useful aromatic hydrocarbon solvent in preparation of the triorganotin ether derivative of the tertiary amine and p-xylene as a useful aromatic hydrocarbon liquid in preparation of the quaternary salt, other aromatic hydrocarbon solvents and liquids may be used. A number of aromatic hydrocarbon materials are useful for both preparations. Thus, in place of benzene one can use toluene or a xylene, and in place of xylene one can use benzene or toluene, for example. Likewise where the same aromatic hydrocarbon is useful for both preparations, one can proceed directly to quaternization of the triorganotin ether derivative without first separating the ether derivative from the aromatic hydrocarbon solvent in which it is prepared.

For antifoulant utility, a quaternary salt of the invention is included as the antifouling constituent alone or in conjunction with other antifouling agents in conventional marine antifouling paint compositions which contain a resinous polymer in whole or as part as the binder component in their paint compositions. Generally one employs a synthetic vinyl polymer as the resinous binder, such as a vinyl chloride-vinyl acetate copolymer coating resin (e.g. VYHD vinyl resin of Union Carbide Corp.) However, the quaternary salt also may be blended with other conventionally employed resinous polymer binders, such as chlorinated rubber, rosin-vinyl polymer blends, and the like. Our quaternary salt blend readily with these conventional resinous binders. A quaternary salt is included in an amount effective to prevent fouling for the desired period of time and the resinous coating polymer is included in an amount effective to bind this amount of quaternary salt into a coating and adhere the coating to the article, conventionally to an underlying conventional marine primer coating which adheres directly to the article's surface for anti-corrosion protection thereof.

The invention now will be better understood with reference to the following specific examples:

EXAMPLE A

2-Dimethylaminomethyl phenol was prepared by the method of S. Cavitt, "J. Org. Chem.", 27, 1211 (1962). 61.0 gm salicylaldehyde, 127 gm 25% by wt dimethylamine in water and 1.2 gm 10% by wt palladium on charcoal are placed in a pressure bottle of a Parr hydrogenator and hydrogenated until 41.7 lbs of hydrogen are taken up. The experiment is repeated and reaction mixtures combined. The catalyst is filtered off and the filtrate made acidic (pH 2), extracted with ether, and the ether discarded. The aqueous phase is adjusted to pH 8 with NaOH and extracted with ether. The aqueous phase is adjusted to pH 9 with NaOH and extracted with ether. The ether extracts are combined, dried over $MgSO_4$, filtered, and evaporated on a rotating evaporator. There results 111.7 gm of an orange liquid (Percent crude yield - 75). This is fractionated at reduced pressure. The product is collected at 60°–63° C. at 0.5 mm to provide 99.1 gm of a yellow liquid (Percent yield - 65).

2-(Dimethylaminomethyl)phenyltributylstannyl Ether is prepared as follows: 59.6 gm (0.1 mole) bis(tributyltin) oxide and 30.0 gm (0.2 mole) 2-dimethylaminomethyl phenol (as just prepared) are placed in 200 ml benzene. This is slowly heated to reflux in a system equipped with a Dean-Starke tube. After about 30 minutes water began to separate in the Dean-Starke tube. After 72 hours at reflux 1.9 ml of water had separated (theory 1.8 ml). A clear straw colored reaction mixture resulted and benzene is evaporated therefrom on a rotating evaporator to provide 87.7 gm of a yellow liquid. This is fractionated at reduced pressure. The product collected at 165°–168° C. at 0.5 mm is 75.0 gm of a straw colored liquid (Percent yield - 82). Infrared spectral analysis provided bands characteristic of the desired product.

Quaternization of 2-(dimethylaminomethyl)phenyl Tributylstannyl Ether. 50 gm (0.113 mole) 2-(dimethylaminomethyl)phenyl tributylstannyl ether and 500 ml xylene are placed together. Stirring is started and there is added dropwise over 20 minutes 28.5 gm (0.113 mole) 1-bromododecane in 50 ml xylene and heating is carried forth at reflux for a period of 72 hours. Then the solvent is stripped off on a rotating evaporator at reduced pressure (40 mm) to provide 86.7 gm of an orange, slightly viscous liquid. The infrared spectrum showed changes in certain bands attributable to formation of the quaternary salt. Remaining xylene was stripped off at 2 mm to yield 76.3 gm of an orange, slightly viscous liquid.

EXAMPLE B 3-(Diethylamino)Phenyltributylstannyl Ether is prepared by placing 59.6 gm (0.1 mole) bis(tributyltin) oxide and 32.6 gm (0.2 mole) m-dimethylaminophenol in 200 ml of benzene. This is heated to reflux in a system that contains a Dean-Starke tube. After 30 minutes refluxing, water began to separate in the Dean-Starke tube, and after 72 hours a total of 2.2 ml of water had collected (theory 1.8 ml). A brown reaction mixture resulted. This is treated with charcoal, filtered and the benzene evaporated off using a rotating evaporator to provide 87.8 gm of brown liquid. This is fractionated at reduced pressure to collect at 181°–183° C. at 0.5 mm a desired product of 70.8 gm of a yellow, slightly viscous liquid (Percent yield - 78). Infrared spectral analysis shows this product to be the desired 3-(diethylamino)-phenyltributylstannyl ether.

Quaternization of 3-(Diethylamino)Phenyl Tributylstannyl Ether is accomplished with 50.8 gm (0.112 mole) of 3-(diethylamino)phenyl tributylstannyl ether and 28.0 gm (0.112 mole) of 1-bromododecane in 400 ml xylene. This is heated and stirred at reflux for 44 hours. A clear red-brown solution resulted. 300 ml of xylene is stripped off using a Claisen head to provide 113.5 gm of a red-brown, slightly viscous liquid. This is stripped at 2 mm with warming to remove the residual solvent. There remains 85.3 gm of a red-brown, slightly viscous liquid. Infrared spectral analysis shows this to be the desired quaternary salt.

EXAMPLE C 2-(2-Pyridyl)ethyl Tributylstannyl Ether is prepared from 59.6 gm (0.1 mole) of bis(tributyltin) oxide and 24.6 gm (0.2 mole) 2-($\beta$-hydroxyethyl)pyridine in 200 ml benzene. This is stirred and heated to reflux in a system that contains a Dean-Starke tube. After 30 minutes refluxing water began to collect in the Dean-Starke tube and after refluxing 22 hours a total of 2.0 ml of water (theory 1.8 ml) had collected. This is evaporated on a rotating evaporator to provide 82.6 gm of straw colored liquid, which fractionated at reduced pressure. 66.4 gm. of a straw colored liquid are collected at 155°–158° C. at 0.5 mm. (Percent yield - 80.6). Infrared spectral analysis shows this to be the desired ether.

Quaternization of 2-(2-Pyridyl)ethyl Tributylstannyl Ether is accomplished with 51.0 gm (0.124 mole) 2-(2-pyridyl)ethyl tributylstannyl ether and 31.0 gm (0.124 mole) 1-bromododecane in 400 ml xylene. This is stirred and heated at reflux for 24 hours. An orange-brown solution resulted. Most of the solvent is stripped off on a rotating evaporator to provide a 114.0 gm red-brown, slightly viscous liquid. This is stripped at 2 mm with warming to remove residual solvent. There remains 94.0 gm of a red-brown, slightly viscous liquid. Infrared spectral analysis shows this to be a mixture of the tin compounds, halide and the desired compound. Accordingly there are added 150 ml xylene. One then stirs and heats at reflux for 68 hours. The xylene solvent is stripped off as described above to provide 87.6 gm of a brown, slightly viscous liquid. Infrared spectral analysis shows this to be the quaternary salt.

EXAMPLE D 2,4,6-tris(Dimethylaminomethyl)phenol is prepared in general by the procedure of Blicke, "Organic Reactions", 1, 330(1942). 47.0 gm (0.5 mole) phenol and 360 gm 25% by wt dimethylamine in water are mixed together. Stirring was restarted with 150 gm 35% by wt formaldehyde in water added dropwise while maintaining reaction temperature at 20°–25° C. Stirring was continued at 25° C. for 1 hour after the addition was complete. After heating at reflux (90° C.) for 2 hours the solution was red-orange. 100 gm sodium chloride was added portionwise and reflux continued for 30 minutes. The layers were separated while the reaction mixture was still hot. The organic phase was taken into benzene and dried over $MgSO_4$. The drying agent was filtered off and the benzene evaporated on a rotating evaporator to provide 130.3 gm of a red-orange liquid (Percent crude yield - 98). This was distilled at reduced pressure and to collect at 131°–135° C. at 0.5 mm a product of 110.0 gm of yellow liquid (Percent yield - 83). 2,4,6-tri-(Dimethylaminomethyl)phenyl Tributylstannyl Ether is prepared from 59.6 gm (0.1 mole) bis(tributyltin) oxide and 53.0 gm (0.2 mole) 2,4,6-tri-(dimethylaminomethyl)phenol in 200 ml benzene. This is stirred and heated to reflux in a system that contains a Dean-Starke tube. After refluxing 72 hours only 1.0 ml of water had collected in Dean-Starke tube. The benzene is stripped off on a rotating evaporator and 200 ml of toluene are added. An additional 72 hours of refluxing are carried forth during which time an additional 0.5 ml of water was collected. The solvent was stripped off on a rotating evaporator to provide 117.8 gm of an orange liquid. This was fractionated at reduced pressure, 205° C. at 2 mm to 216° C. at 6 mm, to collect the desired product, 42.2 gm of yellow, slightly viscous liquid (Percent yield - 38). Note: Distillation was stopped early in this preparation because product was decomposing in the reaction vessel.

Quaternization of 2,4,6-tris-(dimethylaminomethyl Phenyl Tributylstannyl Ether is accomplished as follows: 37.0 gm (0.067 mole) 2,4,6-tris-(dimethylaminomethyl)phenyl tributylstannyl ether and 33.4 gm (0.134 mole) 1-bromododecane are placed in 150 ml xylene. The resulting mixture is stirred and heated at reflux for 48 hours. After several hours a tan solid began to separate and after 48 hours a brown reaction mixture with some tan solid resulted. The solid is filtered off, washed with xylene and dried to give 121.1 gm of tan solid. Infrared spectral analysis showed this to be amino-hydrobromide with no aromatic character. The solvent was stripped from the filtrate at 6 mm to provide 34.4 gm of viscous, brown liquid which solidified to a waxy solid. Infrared spectral analysis showed this to be the quaternary salt.

EXAMPLE E

N,N-Di-(2-Ethylhexylamino)ethyl Tributylstannyl Ether is prepared from 59.6 gm (0.1 mole) bis(tributyltin) oxide and 57.0 gm (0.2 mole) N,N-Di-(2-ethylhexyl)ethanolamine in 200 ml benzene. This is stirred and heated to reflux in a system that contains a Dean-Starke tube. After refluxing for 22 hours a total of 1.8 ml of water (theory 1.8 ml) had collected in the Dean-Starke tube. The solvent is stripped off on a rotating evaporator to provide 117.0 gm of orange liquid. Upon fractionating at reduced pressure, 80.0 gm of the desired product, a yellow liquid, was collected at 195°–199° C. at 0.5 mm (Percent yield - 70). Infrared spectral analysis showed this to be the desired ether.

Quaternization of N,N-di-(2-ethylhexylamino)ethyl tributylstannyl ether is accomplished as follows: 27.2 gm (0.0445 mole) N,N-di-(ethylhexylamino)ethyl tributylstannyl ether and 7.4 gm (0.0445 mole) benzyl bromide in 150 ml xylene are stirred and refluxed for a total of 116 hours. An orange reaction mixture resulted. Most of the solvent is stripped off on a rotating evaporator. Residual solvent is stripped off at 6 mm using a Claisen head to provide 38.0 gm of orange-brown liquid. Infrared spectral analysis showed this to be largely the desired quaternary salt with the possibility of some unreacted starting materials being present.

EXAMPLE F

N,N-Diethylaminoethyl Tributyltin Ether is prepared from 59.6 gm (0.1 mole) bis(tributyltin) oxide and 23.4 gm (0.2 mole) N,N-diethylethanolamine in 200 ml benzene. This is stirred and heated to reflux in a system which contains a Dean-Starke tube. After 30 minutes water began to collect in the Dean-Starke tube and after 22 hours at reflux 1.8 ml of water (theory 1.8 ml) had collected. The solvent is stripped off on a rotating evaporator to provide 81.1 gm of a straw colored liquid. Upon fractionating at reduced pressure there is collected the desired product, 65.5 gm of water-white liquid, at 135°-139° C. at 0.7 mm (Percent yield - 80). Infrared spectral analysis shows this to be the desired ether.

Quaternization of N,N-diethylaminoethyl Tributylstannyl Ether is accomplished as follows: 52.8 gm (0.130 mole) N,N-diethylaminoethyl tributylstannyl ether and 21.7 gm (0.127 mole) benzyl bromide in 150 ml xylene are stirred and heated at reflux for 48 hours. A clear red-orange reaction mixture forms. The solvent is stripped off on a rotating evaporator to provide 88.9 gm of red-orange liquid. Thin layer chromatography (TLC) indicated that the reaction was not yet complete. Whereupon there are added to 150 ml xylene and refluxing carried forth for an additional 68 hours. The xylene then is stripped as described above to provide 69.2 gm of orange-brown liquid. Infrared spectral analysis showed this to be the desired quaternary salt.

EXAMPLE G

2(N-Morphilino)ethyl Tributylstannyl Ether is prepared from 59.6 gm (0.1 mole) bis(tributyltin) oxide and 26.2 gm (0.2 mole) N(β-hydroxyethyl)morpholine in 200 ml benzene. This is stirred and heated to reflux in a system which contains a Dean-Starke tube. After 30 minutes refluxing water began to collect in the Dean-Starke tube and after refluxing for 22 hours 1.8 ml of water (theory 1.8 ml) had collected. The benzene is evaporated on a rotating evaporator to provide 84.4 gm of clear yellow liquid. This is fractionated at reduced pressure with the desired product, 65.6 gm of water-white liquid, collected between 156° C. at 0.5 mm to 165° C. at 0.7 mm (Percent yield - 79.2). Infrared spectral analysis shows this to be the desired ether.

Quaternization of 2-(N-morphilino)Ethyl Tributylstannyl Ether is accomplished as follows: 47.2 gm (0.112 moles) 2-(N-morphilino)ethyl tributylstannyl ether and 19.1 gm (0.112 moles) benzyl bromide in 150 ml xylene are stirred and heated at reflux for 138 hours. A clear bright red reaction mixture resulted. The xylene solvent is stripped off at 6 mm to provide 63.2 gm of red-brown liquid. Infrared spectral analysis showed this to be the quaternary salt.

EXAMPLE H

3-Dimethylamino-1-Propyl Tributylstannyl Ether is prepared from 59.6 gm (0.1 mole) bis(tributyltin) oxide and 20.6 gm (0.2 mole) 3-dimethylamino-1-propanol in 200 ml benzene. This is stirred and heated to reflux in a system that contains a Dean-Starke tube. After 30 minutes refluxing water began to collect in the Dean-Starke tube and after refluxing for 22 hours a total of 1.9 ml of water (theory 1.8 ml) had collected. The benzene is stripped off on a rotating evaporator to provide 77.1 gm of straw colored liquid. This is fractionated at reduced pressure, with 53.0 gm water-white liquid (Percent yield - 67.6) being collected at 135°-139° C. at 0.7 mm. Infrared spectral analysis shows this to be the desired ether.

Quaternization of 3-Dimethylamino-1-Propyl Tributylstannyl Ether is carried forth as follows: 44.4 gm (0.113 mole) 3-dimethylamino-1-propyl tributylstannyl ether and 19.4 gm (0.113 mole) benzyl bromide in 150 ml xylene are stirred and heated at reflux for 114 hours. A clear tan solution results which contained a small amount of a gummy solid. The solvent is stripped off at 6 mm to provide 61.1 gm of brown liquid with some solid. Infrared spectral analysis showed the liquid to be the quaternary salt.

EXAMPLE I

2-Dimethylamino-2-Methyl-1-Propyl Tributylstannyl Ether is prepared from 59.6 gm (0.1 mole) bis(tributyltin) oxide and 23.4 gm (0.2 mole) 2-dimethylamino-2-methyl-1-propanol in 200 ml benzene. This is stirred and heated to reflux in a system that contains a Dean-Starke tube. After 30 minutes water began to collect in the Dean-Starke tube and after 46 hours only 1.6 ml of water (theory 1.8 ml) had collected. Solvent is stripped off on a rotating evaporator to provide 78.3 gm of straw colored liquid. This is fractionated at reduced pressure to collect the desired product, 52.7 gm of water-white liquid (Percent yield - 65), at 132°-137° C. at 0.5 mm. Infrared spectral analysis shows this to be the desired ether.

Quaternization of 2-(dimethylamino)-2-Methyl-1-Propyl Tributylstannyl Ether is accomplished with 40.7 gm (0.10 mole) 2-(dimethylamino)-2-methyl-1-propyl tributylstannyl ether and 17.1 gm (0.10 mole) benzyl bromide in 150 ml xylene. This is stirred and heated at reflux for 72 hours. A clear yellow-tan solution resulted. The solvent is stripped off at 6 mm to provide 56.2 gm of tan slightly viscous liquid. Infrared spectral analysis shows this to be the quaternary salt.

EXAMPLE J

N,N-Dibutylaminoethyl Tributylstannyl Ether is prepared from 59.6 gm (0.1 mole) bis(tributyltin) oxide and 34.6 gm (0.2 mole) N,N-dibutylethanolamine in 200 ml benzene. This is stirred and heated to reflux in a system that contains a Dean-Starke tube. After 30 minutes water began to collect in the Dean-Starke tube and after refluxing for a period of 22 hours a total of 1.8 ml of water (theory 1.8 ml) had collected. A rotating evaporator is used to remove the benzene and to provide 95.1 gm of red-orange liquid. This is fractionated at reduced pressure with collection at 163°-166° C. at 0.7 mm of 73.1 gm of yellow liquid (Percent yield - 79). Infrared spectral analysis shows this to be the desired ether.

Quaternization of N,N-Dibutylaminoethyl Tributylstannyl Ether is accomplished with 46.2 gm (0.1 mole) N,N-dibutylaminoethyl tributylstannyl ether and 17.1 gm (0.1 mole) benzyl bromide in 150 ml xylene. This is stirred and heated at reflux for 126 hours. A clear orange solution resulted. 100 ml of solvent is stripped off using a Claisen head at atmospheric pressure. Residual solvent is stripped off at 6–8 mm to provide 60.7 gm of red-orange liquid. Infrared spectral analysis shows this to be the quaternary salt.

EXAMPLE K

2-[N-Pyrollidinyl]ethyl Tributylstannyl Ether is prepared from 65.0 gm (.109 mole) bis(tributyltin) oxide and 25.0 gm (.217 mole) N-($\beta$-hydroxyethyl)pyrolidine in 200 ml benzene. This is stirred and heated to reflux in a system that contains a Dean-Starke tube. After refluxing 20 hours, a total of 2.0 ml of water (theory 1.96 ml) had collected in the Dean-Starke tube. The solvent is stripped off on a rotating evaporator to provide 94.0 gm of yellow liquid. This is fractionated at reduced pressure with collection at 150°–154° C. at 0.3 mm of water-white liquid (Percent yield - 63). Infrared spectral analysis shows this liquid to be the desired ether.

Quaternization of 2-(N-pyrrolidinyl)Ethyl Tributstannyl Ether is accomplished as follows: 38.8 gm (0.096 moles) 2-(N-pyrrolidiny)ether tributylstannyl ether and 16.4 gm (0.096 moles) benzyl bromide in 150 ml xylene are heated and stirred at reflux temperature for 120 hours. A clear red-brown material resulted. 100 ml solvent are stripped off at atmospheric pressure using a Claisen head. Residual solvent is stripped off at 6–8 mm to provide 57.0 gm of brown liquid. Infrared spectral analysis shows this to be the quaternary salt.

EXAMPLE L

1-Dimethylamino-2-Propyl Tributylstannyl Ether is prepared from 89.4 gm (0.15 mole) bis(tributyltin) oxide and 30.9 gm (0.3 mole) 1-dimethylamino-2-propanol in 200 ml benzene. This is stirred and heated to reflux in a system that contains a Dean-Starke tube. After refluxing 23 hours a total of 2.6 ml of water (theory 2.7 ml) had collected in the Dean-Starke tube. The solvent is stripped off on a rotating evaporator to provide 111.0 gm of yellow liquid. This is fractionated at reduced pressure with collection at 167°–175° C. at 0.5 mm of 63.4 gm of straw colored liquid. (Percent yield - 54). Infrared spectral analysis shows this liquid to be the desired ether.

Quaternization of 1-Dimethylamino-2-Propyl Tributylstannyl Ether is accomplished with 47.8 gm (0.122 mole) 1-dimethylamino-2-propyl tributylstannyl ether and 20.9 gm (0.122 mole) benzyl bromide in 150 ml xylene. This is stirred and heated at reflux for 120 hours. A clear yellow solution resulted. 100 ml of solvent is stripped off at atmospheric pressure using a Claisen head. Residual solvent is stripped off at 6–8 mm to provide 69.1 gm of yellow-orange liquid. Infrared spectral analysis shows this to be probably the quaternary salt. However, the possibility of it merely being a mixture cannot be ruled out.

EXAMPLE M 2-(N-Piperazino)ethyl Tributylstannyl Ether is prepared from 59.6 gm (0.1 mole) bis(tributyltin) oxide and 26.0 gm (0.2 mole) N-($\beta$-hydroxyethyl)piperazine in 200 ml benzene. This is stirred and heated to reflux in a system that contains a Dean-Starke tube. After 30 minutes refluxing water began to collect in the Dean-Starke tube and after 22 hours of refluxing a total of 1.8 ml of water (theory 1.8 ml) had collected. Solvent is stripped off on a rotating evaporator to provide 84.3 gm of yellow liquid. This is fractionated at reduced pressure and 35.9 gm of a water-white desired product (Percent yield - 43) was collected at 160°–167°, C. at 0.5 mm. Infrared spectral analysis shows this product to be the desired ether.

Quaternization of 2-(N-piperazino)Ethyl Tributylstannyl Ether is accomplished with 29.0 gm (0.07 mole) 2-(N-piperazino)ethyl tributylstannyl ether and 12.0 gm (0.07 mole) benzyl bromide in 150 ml xylene. This is stirred and heated at reflux for 120 hours. A clear red-brown reaction mixture resulted. 100 ml solvent are stripped off at atmospheric pressure using a Claisen head. Residual solvent is stripped off at 6 mm to provide 41.9 gm of brown liquid. Infrared spectral analysis shows this to be the desired quaternary salt.

EXAMPLE N

2-Diisopropylaminoethyl Tributylstannyl Ether is prepared from 89.4 gm (0.15 mole) bis(tributyltin) oxide and 43.5 gm (0.30 mole) 2-diisopropylaminoethanol in 200 ml benzene. This is stirred and heated to reflux in a system that contains a Dean-Starke tube. After refluxing for 23 hours a total of 2.6 ml of water (theory 2.7 ml) had collected in the Dean-Starke tube. Solvent is stripped off on a rotating evaporator to provide 134.3 gm of orange liquid. This is fractionated at reduced pressure with collection at 147°–155° C. at 0.4 mm of 87.6 gm of straw liquid (Percent theory - 73). Infrared spectral analysis shows this liquid to be the desired ether.

Quaternization of 2-(di-isopropylamino)Ethyl Tributylstannyl Ether is accomplished with 54.0 gm (0.12 mole) 2-(di-isopropylamino)ethyl tributylstannyl ether and 20.6 gm (0.12 mole) benzyl bromide in 150 ml xylene. This is stirred and heated at reflux for 120 hours. A clear yellow-orange solution resulted. 100 ml solvent are stripped off at atmospheric pressure using a Claisen head. Residual solvent is stripped off at 6–8 mm to provide 74.4 gm of yellow-orange liquid. Infrared spectral analysis shows this to be the desired quaternary salt.

Each of the quaternary salts prepared in preceding Examples A through N, in addition to produce structural confirmation by infrared spectral analysis, were examined by thin layer chromatography (TLC) using methanol and chloroform as developers. In all instances there was evidence of only a slight amount, or less, of unreacted starting materials present in the quaternary salt products.

ANTIFOULING EVALUATIONS

Each of the precedingly prepared quaternary salts of Examples A through N were evaluated from antifouling activity in the Atlantic Ocean natural seawater near Miami Beach, Florida, United States of America.

The preparation, exposure, and evaluation of test panels for these evaluations were as follows: Each quaternary salt was hand mixed in a 1 to 9 ratio by weight with a commercially available polyvinylacetae - acrylic copolymer latex (e.g. No. 2345, National Starch Company). 1.5 grams of this quaternary salt/latex mixture then was spread uniformly over a centrally located 5 inch diameter circle onto a rigid polyvinylchloride test panel and dried. One test panel having a white background and another panel having a black background were prepared for each evaluated quaternary salt. The white-background panel facing up was immersed in the sea water at a depth of about 4 inches. The black-background panel facing down was immersed in the sea water at a depth of about 61 inches. Immersion exposures were continued for six weeks before the condition of the panels was evaluated. Panels at about 4 inch depth were rated for resistance to algal growth on a comparative scale of 0 to 10 equals no growth and 0 equals completely fouled. Panels at about 61 inch depth were rated for resistance to hard fouling on a similar comparative scale of 0 to 10 where 10 equals no fouling and 0 equals complete fouling. It was also noted whether the hard fouling was of barnacles, tunicates, encrusting, bryozoana oysters, hydroids, or tube worms or amphipods. Ratings were made of both the painted circular areas and the background areas of the panels.

In addition to preparation, exposure, and evaluation of the panels involving the quaternary salts and unpainted control areas of those panels, two control systems were included and evaluated for comparison purposes. Like white- and black-faced test panels were prepared with centrally located 5-in. dia. circular coatings only of the latex, as a negative control. Like white- and black-faced test panels also were prepared with centrally located 5-in. dia. circular coatings thereon of 1.5 grams of a 1 to 9 ratio by weight of bis(tributyltin) oxide (TBTO) to the latex. These served as a positive control as the TBTO is a known toxicant for marine organisms.

Data of the just described evaluations are presented in the following TABLE I.

ranked as excellent with these each being especially preferred materials for practice of the invention; the quaternary salt of Example G receives a ranking of good and the quaternary salt of Example J receives a ranking of fair with these two salts being preferred materials for practice of the invention; the quaternary salts of Examples E, F, H, and M rank as poor, yet still perform closely equivalent to the TBTO control material, and the quaternary salts of Examples A, B, C, and D rank from poor to very poor, yet do exhibit useful antifouling activity. Of note is that the negative control of latex only under this ranking system ranks as ineffective. None of the quaternary salts, whose performances were evaluated were noted to exhibit any "throwing power" in protecting uncoated area of the test panel.

While certain specific and illustrative embodiments have been described so as to teach the invention with great specificity, it will be obvious therefrom that various changes and modifications may be made therefrom without departing from the true spirit and scope of the invention. For example, while the organo-portion of the organotin moiety has been illustrated by example by butyl radicals and on a broader scope taught as being of certain alkyl radicals, it will be apparent that these alkyl radicals can be replaced in whole or part by phenyl radicals, such as by the triphenyltin moiety being substituted for the tributyltin moiety to provide other embodiments of the invention. Likewise, while our quaternary salts have been specifically taught and illustrated with their ether linkage being bivalent oxygen, it will be apparent that the ether linkage could be a bivalent sulfur and specifically a thioether with corresponding

TABLE I

| | PANEL ANTIFOULING ACTIVITY EVALUATION | | | |
|---|---|---|---|---|
| | Activity Rating[a] | | | |
| Material | Upper (facing up) | | Lower (facing down) | |
| Evaluated | Covered Area | Uncovered Area | Covered Area | Uncovered Area |
| Ex. A Quaternary Salt | 3 | 0 | 9f | 4,a,b,c,d,e,f |
| Ex. B Quaternary Salt | 3 | 2 | 9f | 0,a,b,c,d,e,f |
| Ex. C Quaternary Salt | 2 | 0 | 9f | 2,a,b,c,d,e,f |
| Ex. D Quaternary Salt | 0 | 0 | 9f | 2,a,b,c,d,e,f |
| Ex. E Quaternary Salt | 6 | 2 | 8f | 2,a,b,c,d,e,f |
| Ex. F Quaternary Salt | 5 | 2 | 9f | 2,a,b,c,d,e,f |
| Ex. G Quaternary Salt | 10 | 4 | 8f | 2,a,b,c,d,e,f |
| Ex. H Quaternary Salt | 5 | 2 | 10 | 2,a,b,c,d,e,f |
| Ex. I Quaternary Salt | 10 | 6 | 9 | 4,a,d,f |
| Ex. J Quaternary Salt | 8 | 2 | 9 | 2,a,b,c,d,e,f |
| Ex. K Quaternary Salt | 10 | 6 | 9 | 2,a,b,c,d,e,f |
| Ex. L Quaternary Salt | 10 | 4 | 9 | 2,a,b,c,d,e,f |
| Ex. M Quaternary Salt | 5 | 2 | 9f | 2,a,b,c,d,e,f |
| Ex. N Quaternary Salt | 10 | 4 | 9 | 2,a,b,c,d,e,f |
| TBTO (Positive Control) | 5 | 3 | 9 | 2,a,b,c,d,e,f |
| Latex only (Negative Control) | 0 | 0 | 0 | 0,a,b,c,d,e,f |

[a]Activity was rated on a scale of 0 to 10 where 10 = no fouling and 0 = completely fouled. Hard fouling was further noted as (a) barnacles, (b) tunicates, (c) encrusting bryozoans, (d) oysters, (e) hydroids, (f) tube worms and ampliphods.

From the foregoing evaluations, overall performance rankings can be given to the various evaluated quaternary salts and controls by considering the sums of the 0–10 ratings for the covered areas on the upper and lower immersed panels. This summing of observed performance ratings gives equal service value to resistance to soft fouling (i.e. as by algae) and to hard fouling (as by hard-shell and other marine organisms). In such an overall comparative performance ranking for comparison purposes a sum total for the two 0–10 ratings equaling 20 warrants a ranking of "outstanding", a sum total of 19 is ranked as "excellent", a sum total of 18 is ranked as "good", a sum total of 17–16 is ranked as "fair", a sum total of 15–10 is ranked as "poor", a sum total of 9–1 is ranked as "very poor", and a sum total of 0 is ranked as "ineffective". Under this performance ranking system, the quaternary salts of I, L, K, and N are changes of oxygen to sulfur in reactants for preparation of the quaternary salts. All these just mentioned and other changes and modifications will be apparent to the art. Of course the particular usages of, preparations of, and quaternary salts of these changes and modifications will not necessarily each be the equivalents of and equal to and may in some instances be inferior and in other instances superior to those taught in the present disclosure with the present invention limited only to the extent as set forth in the appended claims.

We claim:

1. A quaternary salt of an aryl halide or a $C_8$–$C_{24}$ aliphatic hydrocarbon halide and a tertiary amine containing a triorganostannyl ether moiety whose etheral oxygen atom links a triorganotin radical to a carbon atom at least two carbon atoms removed from a tertiary amino nitrogen atom of the tertiary amine, and which quaternary salt is of the formula

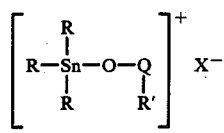

wherein

X is Cl, Br, or I, each R is an alkyl radical of up to 12 carbon atoms with the sum total of the carbon atoms in the three not exceeding 24, with no more than one of the three containing more than 4 carbon atoms, and with each of the three not necessarily the same R, R' is an aryl hydrocarbon radical, or a $C_8$–$C_{24}$ alkyl radical, and Q is a quaternized moiety of a tertiary amine moiety selected from the group consisting of an aliphatic tertiary amine moiety of the structure

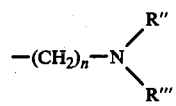

wherein n is a whole integer of from 2 to 5, and a methyl radical may replace a -H for up to and including two of the -H in the —$(CH_2)_n$— chain, and R" and R'" are $C_1$–$C_{10}$ alkyl radicals which are not necessrily the same, and a tertiary amine structural moiety including an aromatic ring of the structure

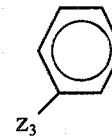

wherein Z is the same or different and at least one Z is —$NR_2$ or —$(CH_2)_nNR_2$ and any remaining Z is H, with R an alkyl radical having from 1 to 4 carbon atoms, and n is a whole number integer of from 1 to 5.

2. The quaternary salt of claim 1 in which each R in the triorganotin radical is a butyl radical, R' is the benzyl radical, and X is bromine.

3. The quaternary salt of claim 1 of benzyl bromide and 2-dimethylamino-2-methyl-1-propyl tributylstannyl ether.

4. The quaternary salt of claim 1 of benzyl bromide and 1-dimethylamino-2-propyl tributylstannyl ether.

5. The quaternary alt of claim 1 of benzyl bromide and 2-diisopropylaminoethyl tributylstannyl ether.

6. The quaternary salt of claim 1 of benzyl bromide and N,N-dibutylaminoethyl tributylstannyl ether.

7. A coating composition for an article to be used in water to inhibit marine fouling thereof which comprises a resinous polymer and an amount effective to prevent fouling of a quaternary salt of an aryl halide or a $C_8$ to $C_{24}$ aliphatic hydrocarbon halide and a tertiary amine containing a triorganostannyl ether moiety whose ethereal oxygen atoms links a triorganotin radical to a carbon atom at least two carbon atoms removed from a tertiary amino nitrogen atom of the tertiary amine, said quaternary salt having the formula recited in claim 1.

8. The coating composition of claim 7 in which the quaternary salt is of benzyl bromide or dodecyl bromide and the tertiary amine containing a tributylstannyl ether moiety whose etheral oxygen atom links a tributyltin radical to a carbon atom at least two carbon atoms removed from a tertiary amino nitrogen atom of the tertiary amine.